(12) United States Patent
Chiang et al.

(10) Patent No.: US 10,908,571 B2
(45) Date of Patent: Feb. 2, 2021

(54) ONLINE MULTI-PERIOD POWER DISPATCH WITH RENEWABLE UNCERTAINTY AND STORAGE

(71) Applicant: Bigwood Technology, Inc., Ithaca, NY (US)

(72) Inventors: Hsiao-Dong Chiang, Ithaca, NY (US); Lin Zeng, Ithaca, NY (US); Pei Bie, Guangzhou (CN); Buhan Zhang, Wuhan (CN); Ning Zhou, Vestal, NY (US)

(73) Assignee: Bigwood Technology, Inc., Ithaca, NY (US)

( * ) Notice: Subject to any disclaimer, the term of this patent is extended or adjusted under 35 U.S.C. 154(b) by 106 days.

(21) Appl. No.: 16/356,960

(22) Filed: Mar. 18, 2019

(65) Prior Publication Data
US 2020/0301384 A1     Sep. 24, 2020

(51) Int. Cl.
G05B 19/42      (2006.01)
G05B 19/042     (2006.01)
H02J 3/38       (2006.01)
H02J 13/00      (2006.01)
H02J 3/00       (2006.01)

(52) U.S. Cl.
CPC ............ *G05B 19/042* (2013.01); *H02J 3/382* (2013.01); *H02J 13/0006* (2013.01); *G05B 2219/2639* (2013.01); *H02J 3/003* (2020.01)

(58) Field of Classification Search
None
See application file for complete search history.

(56) References Cited

U.S. PATENT DOCUMENTS 9,964,980 B2 * 5/2018 Chiang ............... G05F 1/66
2004/0257059 A1 * 12/2004 Mansingh ............ H02J 3/00
                                              324/76.11

(Continued)

OTHER PUBLICATIONS

"Zoka et al., Proposal of a Fast Computation Method for Thermal Capacity and Voltage ATC by Means of Homotopy Functions, 2007, IEEJ Trans. PE, vol. 127, No. 10" (Year: 2007).*

(Continued)

*Primary Examiner* — Santosh R Poudel
(74) *Attorney, Agent, or Firm* — Tong J. Lee (57) ABSTRACT

A computer system provides real-time control of power dispatch for a power system. The power system includes power generators, renewable power generators, load, and storage devices interconnected by a power grid. The computer system obtains input data, and solves an online multi-period power dispatch problem formulated from the input data and incorporates AC power flow in the power grid. The computer system generates control signals according to a solution of the online multi-period power dispatch problem, and sends the control signals to controllers of the power generators and the storage devices. In every time period during operation of the power system, the computer system updates the solution, generates updated control signals according to the updated solution, and sends the updated control signals to the controllers to continuously operate the power system with minimized operational cost while fully utilizing renewable power output.

20 Claims, 6 Drawing Sheets

(56) References Cited

U.S. PATENT DOCUMENTS

| | | | | |
|---|---|---|---|---|
| 2010/0138062 A1* | 6/2010 | Zheng | ............... | F03D 9/255 |
| | | | | 700/291 |
| 2014/0257715 A1* | 9/2014 | Chiang | ............... | H02J 3/06 |
| | | | | 702/34 |
| 2015/0039374 A1* | 2/2015 | Phan | ............ | G06Q 10/06313 |
| | | | | 705/7.23 |
| 2015/0278412 A1* | 10/2015 | Ghosh | ............... | G06F 30/20 |
| | | | | 703/2 |
| 2016/0259314 A1* | 9/2016 | Dhople | ............ | G05B 19/102 |

OTHER PUBLICATIONS

"Wu et al., Two-parameter homotopy method for nonlinear equations, Jul. 16, 2009, Springer" (Year: 2009).*

"Jabr, A Primal-Dual Interior-Point Method to Solve the Optimal Power Flow Dispatching Problem, Feb. 10, 2003; Kluwer Academic Publishersy" (Year: 2003).*

"Sifuentes et al. Hydrothermal Scheduling Using Benders Decomposition: Accelerating Techniques, Aug. 2007, IEEE Transactions on Power Systems, vol. 22, No. 3" (Year: 2007).*

Bie el at, "Online multiperiod power dispatch with renewable uncertainty and storage: a two-parameter homotopy-enhanced methodology," IEEE Trans. Power Syst., vol. 33, No. 6, pp. 6321-6331, Nov. 2018.

Lorca et al, "Adaptive robust optimization with dynamic uncertainty sets for multi-period economic dispatch under significant wind," IEEE Trans. Power Syst., vol. 30, No. 4, pp. 1702-1713, Jul. 2015.

* cited by examiner

ONLINE MULTI-PERIOD POWER DISPATCH WITH RENEWABLE UNCERTAINTY AND STORAGE

TECHNICAL FIELD

Embodiments of the invention pertain to real-time control of power dispatch in a power system that includes renewable power sources and power storage.

BACKGROUND

Significant efforts have been directed to the task of solving power dispatch with renewable energy and storage. The majority of existing approaches for online economic dispatch under renewable energy (with or without storage), however, were made based on the power balance equation or direct current (DC) power flow and DC line flow limits. This type of approach captures the physical power flows less realistically than its alternating current (AC) counterpart. First, since the power balance equation instead of the AC power flow equations is used, the network transfer capability of wheeling renewable energy to loads is not ensured. Thus, the obtained solution may not be executable. Second, while DC power flow may be a good approximation of AC power flow, as loading conditions become heavy, the power flow results from the DC and AC power flows can differ considerably, meaning that the solutions obtained by the power balance equation and the DC line flow limits may violate the thermal limits or voltage limits. Third, due to the high operation cost of energy storage, the accuracy of dispatch results for storage devices is important.

Incorporating AC power flow equations and thermal limits into existing online power dispatch problems creates a large-scale non-convex constrained optimization problem. Several challenges arise, mostly computational speed and robustness. For example, the conventional interior point method (IPM), e.g., the primal-dual IPM (PDIPM), may encounter computational difficulties such as divergence and slowness issues. In large power systems with renewable energy and storage, a more effective and efficient method is needed for online applications.

SUMMARY

In one embodiment, a method is provided for real-time controlling power dispatch in a power system that includes power generators, renewable power generators, load, and storage devices interconnected by a power grid. The method comprises obtaining input data including load forecasting data, forecasting data of the renewable power generators, participation factor of the power generators, network data of the power grid and a current system operating point. The method further comprises solving an online multi-period power dispatch problem, which is formulated from the input data and incorporates AC power flow in the power grid. The method further comprises generating control signals according to a solution of the online multi-period power dispatch problem; and sending the control signals to controllers of the power generators and the storage devices via a communication network, to thereby adjust power generated by each power generator, and charge power or discharge power of each storage device. In every time period during operation of the power system, the solution is updated, updated control signals are generated according to the updated solution, and the updated control signals are sent to the controllers to continuously operate the power system with minimized operational cost while fully utilizing renewable power output. The online multi-period power dispatch problem is decomposed into multiple single-period subproblems. Each of the single-period subproblems has an objective of minimizing a total operational cost of the power system under system constraints that include at least power generation limits, thermal limits and voltage limits and exclude intertemporal constraints. Each single-period subproblem is solved using a homotopy-enhanced primal-dual interior point method (PDIPM) to produce the solution compliant with the system constraints.

In another embodiment, a computer system is provided for performing the aforementioned method. The computer system includes one or more processors and one or more memory devices. The one or more processors are operative to perform the aforementioned method.

Other aspects and features will become apparent to those ordinarily skilled in the art upon review of the following description of specific embodiments in conjunction with the accompanying figures.

DETAILED DESCRIPTION

In the following description, numerous specific details are set forth. However, it is understood that embodiments of the invention may be practiced without these specific details. In other instances, well-known techniques have not been shown in detail to prevent obscuring the understanding of this description. Someone skilled in the art will appreciate the fact that the invention may be practiced without such specific details. Those of ordinary skill in the art, with the included descriptions, will be able to implement appropriate functionality without undue experimentation.

In the following disclosure, the term "renewables" refers to "renewable power sources." Examples of renewable power sources include, but are not limited to, wind and solar power sources. The term "renewable uncertainty" refers to the uncertain power output of renewable power sources, and the term "storage" or "storage device," unless specifically indicated otherwise, refers to an electrical or power storage device; e.g., a battery. The terms "power source" and "power generator" are equivalent and may be used interchangeably. The terms "online" and "real-time" are used interchangeably.

To address the issues facing the existing online economic dispatch with renewable power sources, a method is disclosed herein for providing online multi-period power dispatch with renewable uncertainty and storage. The disclosed method takes into account AC power flow equations and voltage and thermal limits to ensure sufficient network transfer capability. A system performs the disclosed method is also disclosed.

More specifically, the disclosed method uses a three-stage solution methodology to reliably and efficiently solve the online multi-period power dispatch problem. The first stage decomposes the problem into multiple single-period subproblems and solves each subproblem by a one-parameter homotopy-enhanced method. The second stage constructs boundary conditions to coordinate the subproblems with each other. The third stage solves the subproblems using a two-parameter homotopy-enhanced PDIPM while satisfying the boundary conditions. This solution methodology not only enhances the robustness of the PDIPM, but also improves the speed of solving the online multi-period power dispatch problem.

Regarding renewable uncertainty, the disclosed method incorporates a set of scenarios of renewable power output, taking into account both linear and nonlinear dependence between different renewable energy sources generated from historical data. A scenario reduction procedure is performed by a clustering technique; e.g., affinity propagation (AP) clustering, to reduce the number of scenarios to an acceptable level (e.g., below a predetermined threshold number) without losing the representativeness of the scenarios. The reduced number of scenarios are incorporated into the power system input data to capture the renewable power output despite the uncertainties.

Figure 1:
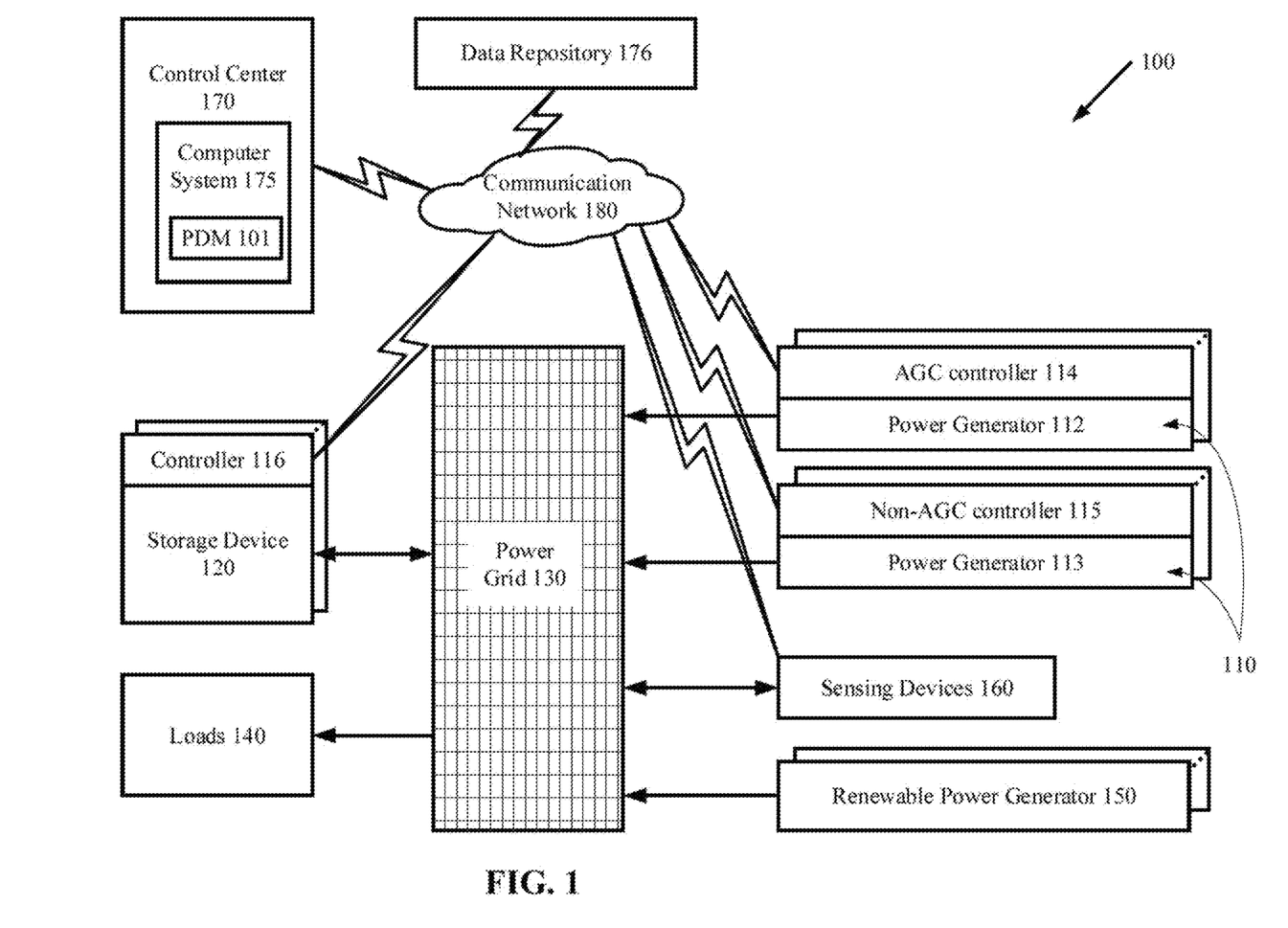
FIG. 1 illustrates a power system in which embodiments of the invention may operate.

FIG. 1 illustrates an example of a power system 100 in which embodiments of the invention may operate. The power system 100 includes multiple power generators 110, renewable power generators 150 (e.g., solar power generators, wind power generators, etc.) and multiple storage devices 120, all of which are coupled to a power grid 130 that includes power transmission lines and power distribution lines. In one embodiment, the power generators 110 may be located in power plants and the renewable power generators 150 may be distributed across a geographic area. Electrical loads 140, such as customers, receive the electrical power via the power grid 130. The storage devices 120 (e.g., batteries) store electricity for consumption on demand. Each storage device 120, which represents both an electrical sink and an electrical source, may be charged and discharged as needed.

The power generators 110 may include automatic-gain-control (AGC)-controlled power generators 112 and non-automatic-gain-control (non-AGC)-controlled power generators 113. The operation of each power generator 112 is controlled by an AGC controller 114, which, according to a given a target set point of system frequency, adjusts the power generation of the power generator 112. The operation of each power generator 113 is controlled by a non-AGC controller 115, which, according to a given target power output, adjusts the power output of the power generator 113. The power system 100 also includes sensing devices 160 monitoring the power output of the power generators 110 and the renewable power generators 150, as well as measuring thermal conditions and voltage levels at a number of locations across the power system 100.

The power system 100 also includes a control center 170 where operators of the power system 100 control the power system operations. An operator in the control center 170 may monitor the system status, and run computer programs on a computer system 175 to control the system operation. In one embodiment, the computer system 175 is in communication with controllers (e.g., the AGC controllers 114 and the non-AGC controllers 115) of the power generators 110, and controllers 116 of the storage devices 120 via a communication network 180 to control the power generation, and charging and discharging of the storage devices 120. The communication network 180 may be a propriety wide-area network or a public network such as the Internet protected with data encryption capabilities.

In one embodiment, the computer system 175 receives input data including forecasting data and historical data of the power system 100. The computer system 175 periodically performs calculations of online multi-period power dispatch, and sends control signals specifying the calculation results to the controllers (e.g., 114 and 115) of the power generators 110 and the controllers 116 of the storage devices 120 via the communication network 180. In one embodiment, the calculations performed by the computer system 175 is to solve an optimization problem using the aforementioned three-stage solution methodology. The calculation results, which are the solution to the optimization problem, indicate the amount of power to be dispatched in the power system 100, among other information.

In one embodiment, an online multi-period power dispatch manager (PDM) 101 performs the disclosed method. In one embodiment, the PDM 101 may be implemented by software stored in a non-transitory machine-readable medium readable and executable by the computer system 175. The computer system 175 has access to a data repository 176 where system data is deposited. Examples of the data repository 176 include, but are not limited to, dynamic random access memory (DRAM) memory devices, hard drives, solid state drives (SSDs), etc. The data repository 176 may be within the control center 170 or may be distributed across a region. The data repository 176 may be accessed by users, such as power system operators, via a user interface such as a display.

The PDM 101 manages the power generation of all committed units in the power system 100. The power generation may be determined periodically (e.g., every 5 minutes, 7 minutes or any time period selected by the user). In an example where each time period is t minutes with N time periods in the horizon, the PDM 101 may calculate the online multi-period power dispatch every t minutes to determine the power generation for the next (N×t) minutes in a receding horizon. Taking N=3 as an example, the PDM 101 uses historical data and forecasting data at time=P to perform the calculation of online multi-period power dispatch for time (P+t, P+2t, P+3t) and obtain a result R(P). At time=P+t, the PDM 101 applies the result R(P) for time=(P+t) to the power system 100, and performs an updated calculation for time (P+2t, P+3t, P+4t) to obtain a result R(P+t), using R(P) as an initial point. The result R(P+t) for time=(P+2t) is applied to the power system 100. The calculation process continues during the operation of the power system 100. The efficiency of the disclosed method ensures that each round of calculation can be completed within the time period of t minutes and can produce a reliable solution. The reliability and efficiency of the disclosed method are significantly improved over conventional methods.

More specifically, the PDM 101 calculates, in real-time and in each time period, the amount of power to be dispatched to the power grid 130 to optimize (i.e., minimize) the total operational cost of the power system 100. The amount of power dispatched includes the power output of non-AGC units (e.g., the power generators 113), the set points of AGC units (e.g., the power generators 112), and the charging and discharging power of each storage device 120. The optimization is made in real-time (i.e., online) and over a forward-rolling time window. The PDM 101 receives an input, which, among others, includes load forecasting data, renewable forecasting data, the participation factor of the AGC units, and the network data. Additionally, the input includes the current operating point (e.g., from a state estimator or from a solved power flow). The input also includes scenarios of renewable energy generation; e.g., the power output of each renewal power generator 150 for the time window under the calculation. The PDM 101 reduces the number of scenarios by clustering them and identifying representative scenarios from each cluster. These representative scenarios, instead of all of the scenarios, are incorporated into the input data to capture uncertainties of the renewable power output.

According to the disclosed method, the PDM 101 first minimizes the operational cost for each single time period, and identifies the power output of non-AGC units, the set points of the AGC units, and the charge/discharge power of the storage devices that correspond to the minimized cost. After performing the single period optimization, the PDM 101 checks the inter-temporal constraints. The inter-temporal constraints include the ramping constraints and storage energy level constraints. An example of ramping is the change in power outputs between two consecutive time periods of a renewable power generator. If all of the inter-temporal constraints are met, then the single period power solution is the multi-period power solution. If any inter-temporal constraint is not met, then the single-period optimizations are updated to incorporate the inter-temporal constraints as boundary conditions. The updated single-period costs are optimized iteratively until all of the inter-temporal constraints are met. The PDM 101 then directs the power system 100 to adjust the power output of non-AGC units, the set points of the AGC units, and the charge/discharge power of the storage devices that correspond to the minimized cost.

In one embodiment, a computer program when executed by a computer (e.g., the computer system 175), causes the computer to perform a method for providing online multi-period power dispatch in a power system with renewable uncertainty and storage. The online multi-period power dispatch may be formulated as a dynamic optimization problem. The objective of an online multi-period power dispatch is to minimize the total operational cost over the defined operating horizon T that includes multiple time periods:

$$\min_{p^{na},p^a,p^{sc},p^{sd}} \sum_{t=1}^{T} \left\{ \begin{array}{l} \sum_{i=1}^{N_{na}} CG_i(p_{i,t}^{na}) + \sum_{i=1}^{N_a} CG_i(p_{set,i,t}^a) + \\ \sum_{i=1}^{N_s} CSC_i(p_{i,t}^{sc}) + \sum_{i=1}^{N_s} CSD_i(p_{i,t}^{sd}) \end{array} \right\} \quad (1)$$

where $p^{na}$, $p_{set}^a$, $p^{sc}$, $p^{sd}$ are the control variables denoting the power output of non-AGC units, the set points of AGC units, and the charging and discharging power of each storage device, respectively. CG is the generation cost function and CSC, CSD are the charging and discharging operating expenditures. $N_{na}$, $N_a$, $N_s$, and T are the total number of non-AGC units, the AGC units, storage devices, and the time periods, respectively.

The following comprehensive set of constraints are respected.
(a) AC Power flow equations:

$$\begin{cases} \tilde{P}_{i,t} = V_{i,t} \sum_{j \in i} V_{j,t}(G_{ij}\cos\tilde{\theta}_{ij,t} + B_{ij}\sin\tilde{\theta}_{ij,t}) \\ \tilde{Q}_{i,t} = V_{i,t} \sum_{j \in i} V_{j,t}(G_{ij}\sin\tilde{\theta}_{ij,t} + B_{ij}\cos\tilde{\theta}_{ij,t}) \end{cases} \quad (2)$$

$$i \in \{1, 2, \cdots, N_b\}, t \in \{1, 2, \cdots, T\}$$

The power injection of each node is:

$$P = \sum_{j \in i} \tilde{p}_{j,t}^a + \sum_{j \in i} p_{j,t}^{na} + \sum_{j \in i} \tilde{p}_{j,t}^r - \sum_{j \in i} p_{j,t}^d - \sum_{j \in i} p_{j,t}^{sc} + \sum_{j \in i} p_{j,t}^{sd} \quad (3)$$

where $p^{na}$, $\tilde{p}^a$ are the power output of a non-AGC unit and the actual power output of the AGC unit; $\tilde{p}^r$ is the renewable output, which is stochastic; $p^d$ is the load forecasting value; $N_b$ is the total number of nodes; i and j are the node indexes; and t is the time period index.

(b) AGC adjustment: For AGC units, an affine adjustment scheme is adopted to deal with renewable uncertainty:

$$\tilde{p}_{i,t}^a = p_{i,t,set}^a - \alpha_i \sum_{k=1}^{N_r} (\tilde{p}_{k,t}^r - E(\tilde{p}_{k,t}^r)), \quad (4)$$

$$\sum_{i=1}^{N_a} \alpha_i = 1, i \in \{1, 2, \cdots, N_a\}$$

where $\alpha_i$ is the participation factor of AGC unit i; $E(\tilde{p}_{k,t}^r)$ is the expectation output of renewable source k for time period t; and $N_r$ is the total number of renewable sources. By adopting this scheme, the power output uncertainty caused by renewable energy can be accommodated by the AGC units.

(c) Power generation limits: All generators' actual active power outputs $p_{i,t}^{na}$, $\tilde{p}_{i,t}^a$ and reactive power outputs $\tilde{q}_{i,t}$ for any time period t are constrained by their physical limits:

$$\begin{cases} \underline{p}_i^{na} \leq p_{i,t}^{na} \leq \overline{p}_i^{na}, i \in \{1, 2, \cdots, N_{na}\} \\ \underline{p}_i^a \leq \tilde{p}_{i,t}^a \leq \overline{p}_i^a, i \in \{1, 2, \cdots, N_a\}, t \in \{1, 2, \cdots, T\} \\ \underline{q}_i \leq \tilde{q}_{i,t} \leq \overline{q}_i, i \in \{1, 2, \cdots, N_g\} \end{cases} \quad (5)$$

(d) Ramping constraints: Multi-period ramping constraints are respected so that the generator ramping capability can accommodate variation in renewables if such a solution exists:

$$\begin{cases} RD_i^{na} \cdot \Delta T \leq p_{i,t}^{na} - p_{i,t-1}^{na} \leq RU_i^{na} \cdot \Delta T, i \in \{1, 2, \cdots, N_{na}\} \\ RD_i^a \cdot \Delta T \leq \tilde{p}_{i,t}^a - \tilde{p}_{i,t-1}^a \leq RU_i^a \cdot \Delta T, i \in \{1, 2, \cdots, N_a\} \end{cases} \quad (6)$$

$$t \in \{1, 2, \cdots, T\}$$

where $RD_i^{na}/RU_i^{na}$ is the downward/upward ramping rate of non-AGC unit i, $RD_i^a/RU_i^a$ is the downward/upward ramping rate of AGC unit i, and $\Delta T$ is the time interval between adjacent time periods.

(f) Storage constraints $$\begin{cases} \underline{E}_i \leq \eta_i E_{i,t-1} + c_i \cdot p_{i,t}^{sc} \cdot \Delta T - \frac{1}{c_i} \cdot p_{i,t}^{sd} \cdot \Delta T \leq \overline{E}_i \\ \underline{p}_i^{sc} \leq p_{i,t}^{sc} \leq \overline{p}_i^{sc} \\ \underline{p}_i^{dc} \leq p_{i,t}^{dc} \leq \overline{p}_i^{dc} \end{cases} \quad (7)$$

$$i \in \{1, 2, \cdots, N_s\}, t \in \{1, 2, \cdots, T\}$$

where $E_{i,t}$ is the energy level of storage device i at time period t; and $\eta_i, c_i$ are the standby loss coefficient and the conversion loss coefficient of storage device i.

(e) Thermal limits:

$$\begin{cases} |\tilde{S}_{f,t}| \leq \overline{S}_l \\ |\tilde{S}_{t,t}| \leq \overline{S}_l \end{cases}, l \in \{1, 2, \cdots, N_l\}, t \in \{1, 2, \cdots, T\} \quad (8)$$

where $\tilde{S}_{f,t}/\tilde{S}_{t,t}$ is the line flow at the "from" bus and "to" bus, respectively, for time period t; and $\overline{S}_l$ is the thermal limit of branch l. $N_l$ is the total number of branches.

(f) Voltage limit:

$$\underline{V}_i \leq \tilde{V}_{i,t} \leq \overline{V}_i, i \in \{1,2,\ldots,N_b\}, t \in \{1,2,\ldots,T\} \quad (9)$$

where $\underline{V}_i$, $\overline{V}_i$ is the lower/upper voltage magnitude limit of bus i.

(g) Treatment of renewable uncertainty. The vector of renewable energy output for a certain time period can be expressed as a set of scenarios:

$$(p_{1,s}^r, p_{2,s}^r, \ldots p_{N_r,s}^r), s \in \{1,2,\ldots,S\}, t \in \{1,2,\ldots,T\} \quad (10)$$

where S is the total number of scenarios and s is the scenario index. Each scenario is a set of power outputs for all of the renewable sources.

For each time period, the scenarios are generated by a scenario generation tool using the copula and Latin hypercube sampling (LHS) with the dependence method. An example of the tool is disclosed in T. Wang, H. D. Chiang, and R. Tanabe, "Toward a flexible scenario generation tool for stochastic renewable energy analysis," 2016 *Power Systems Computation Conference (PSCC)*, Genoa, 2016, pp. 1-7.

$$(\tilde{p}_1^r, \tilde{p}_2^r, \ldots \tilde{p}_{N_r}^r) \sim C(F_1, F_2, \ldots, F_N) \quad (11)$$

where $F_1, F_2, \ldots, F_N$ are the marginal cumulative distribution functions of $\tilde{p}_1^r, \tilde{p}_2^r, \ldots, \tilde{p}_{N_r}^r$, respectively, and C is a properly chosen n-copula function. A scenario generation tool generates scenarios of renewables to account for the linear and nonlinear dependence between renewables, which is composed of two key components: (1) distribution and dependence modeled by a proper copula, and (2) dependent scenario generation by Latin hypercube sampling with the dependence method. The sharpest ramping condition is the ramping between scenarios of two consecutive time periods. The sharpest ramping conditions are incorporated into problem formulation of the online multi-period power dispatch problem.

The proposed problem formulation is a non-convex, constrained, large-scale optimization problem. If a conventional IPM, like the Primal-Dual Interior Point Method (PDIPM), is applied to directly solve this problem, one may encounter computational difficulties, such as divergence and speed issues. To reliably and quickly solve the proposed problem, the disclosed method incorporates the following three aspects: (1) a scenario reduction scheme based on AP clustering; (2) a decomposing scheme; and (3) the homotopy-enhanced PDIPM method.

Scenario Reduction Based on AP Clustering. Scenarios are widely used to capture the uncertainty of renewable energy. One challenging issue is to determine the number of scenarios, since unnecessary scenarios can increase the computational burden. To solve this problem, scenario reduction becomes an important technique.

In one embodiment, an AP cluster algorithm based on the concept of "message passing", is applied to perform scenario reduction (K. Wang, et al. "Adaptive affinity propagation clustering," *arXiv preprint arXiv*: 0805.1096, 2008). One advantage of AP is its ability to determine the number of 'clustered' scenarios without pre-specification. Hence, according to the expected number of scenarios after reduction, the number of clusters may be flexibly chosen into which the scenarios will be grouped.

The continuity property holds for each optimal solution with respect to each scenario examined in the problem formulation. This means that if the optimal solution of scenario s is executed, the adjacent scenarios are also correctable. Under this assumption, one can classify the scenarios of renewable energy output into several groups by using the AP clustering scheme and then selecting the central scenario and the most marginal scenario in each group for the problem formulation. According to numerical experiments, these selected scenarios are sufficient to represent the uncertainty of renewable energy. In cases where an optimal solution obtained under the selected scenarios is uncorrectable for other scenarios (this is very infrequent in most situations), the uncorrectable scenarios can be incorporated into the problem formulation and the new problem is solved again until all of the scenarios are correctable. Experimental results have shown that 200 scenarios of two wind farms may be reduced to ten scenarios sufficiently representing the original 200 scenarios.

Figure 2:
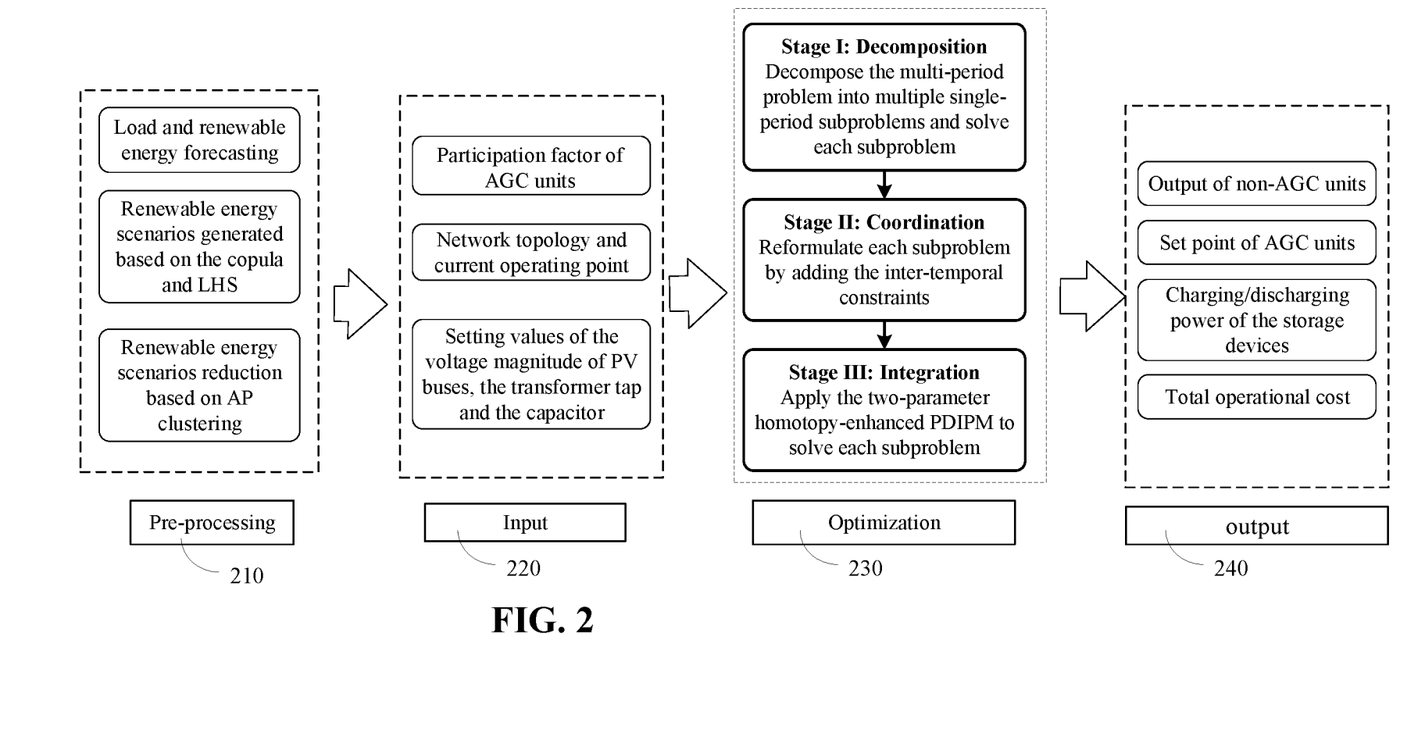
FIG. 2 illustrates an overall approach to the calculations of online multi-period power dispatch according to one embodiment.

The Three-Stage Solution Methodology. The computational complexity of the IPM is polynomial time. To reduce the complexity, the problem is decomposed into multiple small single-period problems to reduce the computational burden and improve the robustness of online multi-period dispatch. FIG. 2 illustrates an overall approach to the calculations of online multi-period power dispatch according to one embodiment. Step 210 is a pre-processing step, step 220 is an input step, step 230 is an optimization step, and step 240 is an output step. The optimization step (step 230) further includes three stages: the decomposition stage (stage I), the coordination stage (stage II), and the integration stage (stage III).

Although there are many constraints in the online multi-period power dispatch problem, only the ramping constraints and storage energy level constraints are inter-temporal. Hence, the proposed problem can be rewritten into the following form:

$$\min_{u(1),\cdots,u(T)} f(x(1), u(1), \cdots x(T), u(T)) \quad (12)$$

$$g(x(t), u(t)) = 0, t\{1, 2, \cdots, T\}$$

$$h_{nt}(x(1), u(1)) \leq h_{nt,max}, t\{1, 2, \cdots, T\}$$

$$h_t(x(1), u(1), \cdots x(T), u(T)) \leq h_{t,max}$$

where $u(t)=[p^{na}(t), p_{set}^a(t), p^{sc}(t), p^{sd}(t)]^T$ denotes the control variable vector of time period t; $x(t)=[x_1(t), x_2(t), \ldots, x_s(t), \ldots, x_S(t)]^T$ denotes the state variable vector of time period t, in which $x_s(t)=[\theta_s(t), V_s(t)]^T$ is the state variable vector under scenario s; g denotes the equality constraints; $h_{nt}$ denotes the inequality constraints that have no time-coupling variables; and $h_t$ denotes the inequality constraints that have time-coupling variables.

Figure 3:
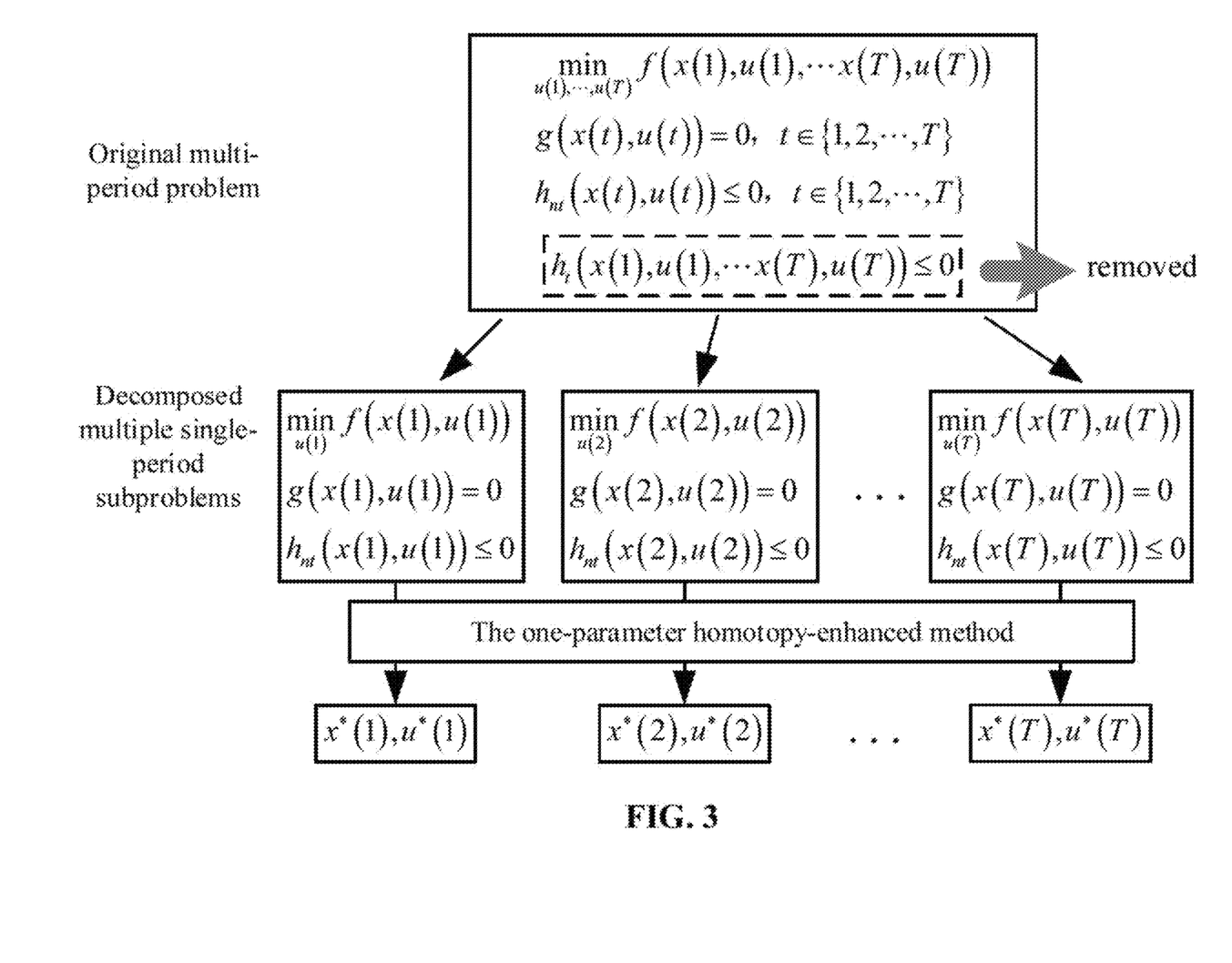
FIG. 3 illustrates the decomposition of a multi-period power dispatch problem according to one embodiment.

Stage I: Decomposition. FIG. 3 illustrates the decomposition of a multi-period power dispatch problem according to one embodiment. The original problem is into multiple single-period subproblems (shown in (13)) if no inter-temporal constraints (ramping constraints and storage energy level constraints) are taken into account (labeled in FIG. 3 as "removed"):

$$\min_{u(t)} f(x(t), u(t)) \qquad (13)$$
$$g(x(t), u(t)) = 0 \qquad t \in \{1, 2, \cdots, T\}.$$
$$h_{nt}(x(t), u(t)) \le h_{nt,max}$$

Then one can solve each subproblem and obtain the solution $(x^*(1), u^*(1)), (x^*(2), u^*(2)), \ldots (x^*(T), u^*(T))$. Since the scale of each subproblem is much smaller than the original problem, it is relatively easy for the PDIPM to solve subproblems. Furthermore, to reliably and quickly solve each subproblem, a one-parameter homotopy-enhanced PDIPM is applied to solve each subproblem. If there are no violations when checking the ramping constraints and storage level constraints, then the combined solution of each subproblem is a solution of the original problem; otherwise, go to stage II.

Figure 4:
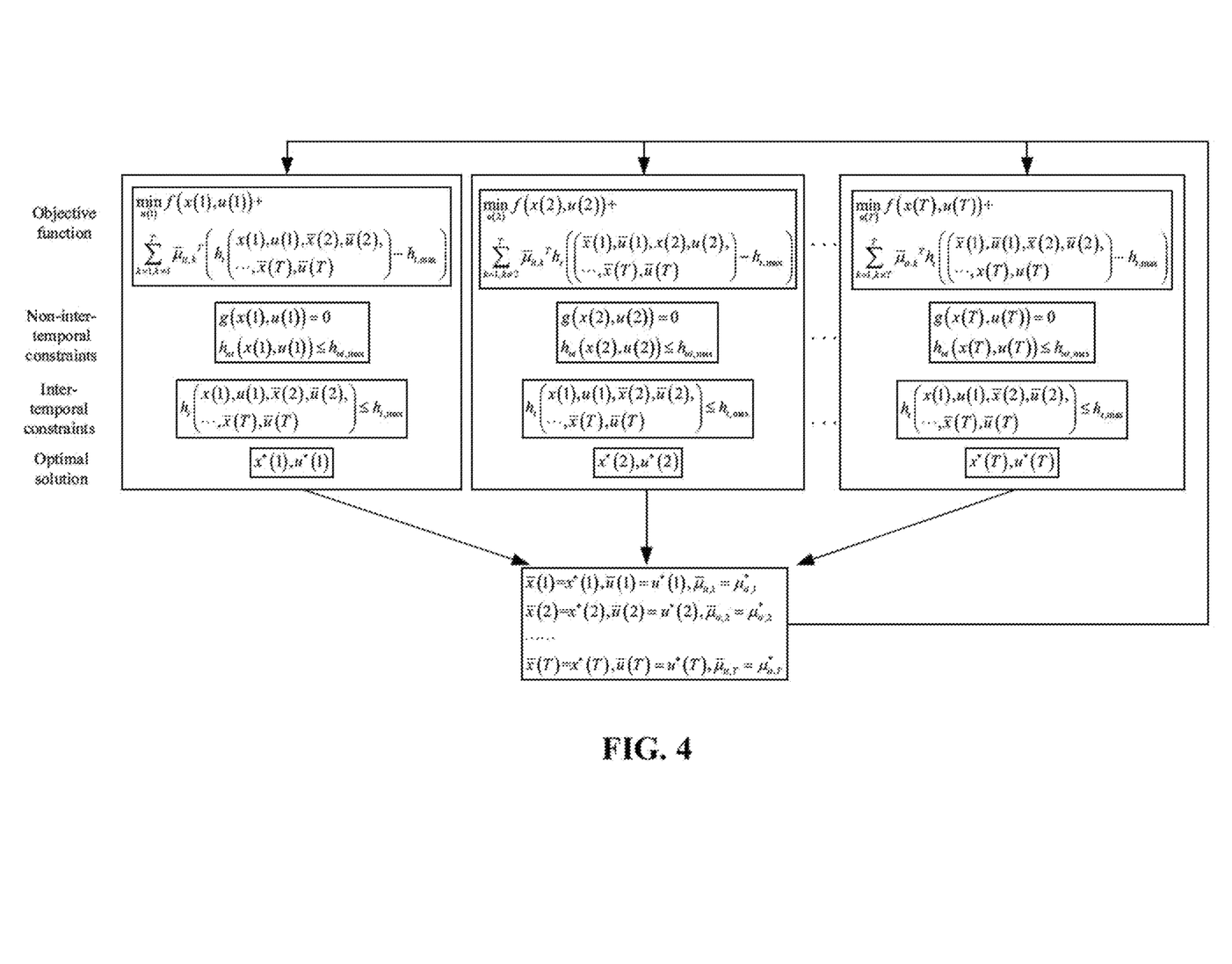
FIG. 4 illustrates the coordination of multiple single-period subproblems according to one embodiment.

Stage II: Coordination. FIG. 4 illustrates the coordination of single-period subproblems according to one embodiment. The solutions of the single-period subproblems are patched together by taking into account the ramping constraints and storage energy level constraints.

If there are violations of the inter-temporal constraints with the solution obtained in stage I, one should reformulate each single-period subproblem by adding back the inter-temporal constraints in the form of boundary constraints. The boundary condition of the (t)th subproblem is shown in (14):

$$h_t\left(\begin{array}{l}\bar{x}(1), \bar{u}(1), \cdots, \bar{x}(t-1), \bar{u}(t-1), x(t), u(t), \\ \bar{x}(t+1), \bar{u}(t+1) \cdots, \bar{x}(T), \bar{u}(T)\end{array}\right) \le h_{t,max}. \qquad (14)$$

In (14), all variables $((\bar{x}(k), \bar{u}(k)), k \ne t)$ that are not related to the (t)th period are set fixed in the (t)th subproblem and decided in other subproblems, termed auxiliary variables. To enforce the satisfaction of the Karush-Kuhn-Tucker (KKT) condition of the original multi-period problem, the boundary constraints in the other subproblems, whose auxiliary variables are decided in the (t)th subproblem, also need to be taken into account. This is done by adding them as relaxed constraints to the objective function weighted by their Lagrange multiplier obtained in other subproblems. Then one can obtain the reconstructed (t)th subproblem in (15):

$$\min_{u(t)} f(x(t), u(t)) + \sum_{k=1, k \ne t}^{T} \bar{\mu}_{it,k}^T \qquad (15)$$

$$\left(h_t\left(\begin{array}{l}\bar{x}(1), \bar{u}(1), \cdots, \bar{x}(t-1), \bar{u}(t-1), x(t), u(t), \\ \bar{x}(t+1), \bar{u}(t+1) \cdots, \bar{x}(T), \bar{u}(T)\end{array}\right) - h_{t,max}\right)$$

$$g(x(t), u(t)) = 0$$

$$h_{nt}(x(t), u(t)) \le h_{nt,max}$$

$$h_t\left(\begin{array}{l}\bar{x}(1), \bar{u}(1), \cdots, \bar{x}(t-1), \bar{u}(t-1), x(t), u(t), \\ \bar{x}(t+1), \bar{u}(t+1) \cdots, \bar{x}(T), \bar{u}(T)\end{array}\right) \le h_{t,max}$$

$$t \in \{1, 2, \cdots, T\}$$

where $\bar{\mu}_{it,k}$ is the Lagrange multiplier vector of inter-temporal constraints that is determined by the (k)th subproblem.

Stage III: Integration. A two-parameter homotopy-enhanced PDIPM is developed to solve each reconstructed subproblem (15) iteratively until the convergence criterion is satisfied.

Note that the reconstructed subproblems in stage II may be infeasible if the initial auxiliary variables are set directly by the solution obtained in stage I. To overcome this issue and also to improve the robustness and speed of solving each subproblem, a two-parameter homotopy-enhanced PDIPM is developed. After each iteration of solving all of the subproblems in (15), the auxiliary variables and inter-temporal Lagrange multiplier need to be updated for the next iteration. The stopping criteria are:

(1) the KKT conditions of all subproblems are satisfied; and $$(2) \max \left\{\begin{array}{l}\|x(1)_n - x(1)_{n-1}\|, \cdots, \|x(T)_n - x(T)_{n-1}\|, \\ \|u(1)_n - u(1)_{n-1}\|, \cdots, \|x(T)_n - u(T)_{n-1}\|, \\ \|(\mu_{it,1})_n - (\mu_{it,1})_{n-1}\|, \cdots, \|(\mu_{it,T})_n - (\mu_{it,T})_{n-1}\|\end{array}\right\} < \varepsilon$$

where n is the iteration index and S is the tolerance.

When the stopping criteria are satisfied, the KKT condition of the original problem is also satisfied, meaning that if the process converges, a local optimal solution can be obtained.

Moreover, if each sub-problem converges and the boundary conditions are satisfied, the patched solution is feasible, and one can stop the process before obtaining a local optimal solution and execute the sub-optimal solution to save time for online application.

The Two-Parameter Homotopy-Enhanced PDIPM. A homotopy-enhanced PDIPM is proposed to solve the subproblems. Homotopy methods are useful in solving difficult problems for which a good starting point, close to a desired solution, is hard to obtain. In many cases, homotopy methods have succeeded in finding solutions where Newton's method failed.

To solve a "difficult" problem, $F(x)=0$, one can construct an appropriate "easy" one, $G(x)=0$, that is easier to solve or has one or more known solutions. Homotopy methods entail embedding a continuation parameter into the "difficult" problem to form a higher dimensional set of nonlinear equations:

$$H(x, \lambda): R^n \times R, x \in R^n, \lambda \in R,$$

that satisfies the following two boundary conditions:

$$H(x,1)=G(x) \qquad (1)$$

$$H(x,0)=F(x) \qquad (2)$$

The following linear, convex homotopy function between the "easy" problem and the "difficult" problem is popular:

$$H(x,\lambda)=\lambda G(x)\pm(1-\lambda)F(x). \quad (16)$$

There are two points to take into consideration when constructing a parameterized problem. (1) Thermal limit constraints are the most complex constraints in the problem because they are numerous and nonlinear. Moreover, the number of violated thermal limit constraints at the optimal solution is far less than the total number of thermal limit constraints. (2) The reconstructed subproblems may be infeasible if the initial auxiliary variables are not chosen properly. Hence, two kinds of constraints are parameterized: thermal limits and inter-temporal constraints.

When solving the subproblems in stage I, there are no inter-temporal constraints. Problem (13) is first solved without thermal limit constraints, as shown below:

$$\min_{u(t)} f(u(t), x(t)) \quad (17)$$
$$\text{s.t. } g(u(t), x(t)) = 0$$
$$h_{nts}(u(t), x(t)) \leq h_{nts,max}$$

Then, to take the thermal limits into account, a one-parameter homotopized problem $H(x,u,\lambda,t)$ is formulated as follows:

$$\min_{u(t)} f(u(t), x(t)) \quad (18)$$
$$\text{s.t. } g(u(t), x(t)) = 0$$
$$h_{nts}(u(t), x(t)) \leq h_{nts,max}$$
$$S_a(u(t), x(t)) \leq S_{a,max} + \lambda(S_a(u_0^*(t), x_0^*(t)) - S_{a,max}),$$
$$a \in A_k$$
$$t \in \{1, 2, \cdots, T\}$$

where $(u_0^*(t),x_0^*(t))$ is the solution of (17) when no thermal limits are taken into account, $h_{nts}$ denotes the inequality constraints without thermal limit constraints in $h_{nt}$, $s_a$ denotes the set of active thermal limit constraints, and $A_k$ is the active set of thermal limit constraints in the (k)th iteration:

$$A_k = \{l | S_l(u_k^*, x_k^*) > 0.9 \overline{S}_l\}. \quad (19)$$

The set of active thermal limit constraints are composed of all the violated ones and all the nearly violated ones (e.g., those constraints that reach 90% of their thermal limits).

The parameter $\lambda$ varies from 1.0 (where the homotopized subproblem (18) equals the thermal limits-free problem (17)) to 0.0 (where the homotopized problem (18) equals the original problem (13)). During the parameter variation, the solution obtained from solving problem (18) with the (k−1)th parameter value is taken as the initial with the (k)th parameter value. With a sequence of decreasing $\lambda$, the upper limits of the thermal limit constraints will move close to their actual limits, and the solution path will then move toward the exact solution of the original problem (13).

When solving the subproblems in stage III, the inter-temporal constraints are included. A two-parameter subproblem $H(x,u,\lambda_1,\lambda_2,t)$ is constructed as follows:

$$\min_{u(t)} f(x(t), u(t)) + \sum_{k=1,k\neq t}^{T} \overline{\mu}_{it,k}^T \quad (20)$$

-continued $$\left( h_t \begin{pmatrix} \overline{x}(1), \overline{u}(1), \cdots, \overline{x}(t-1), \overline{u}(t-1), x(t), u(t), \\ \overline{x}(t+1), \overline{u}(t+1) \cdots, \overline{x}(T), \overline{u}(T) \end{pmatrix} - h_{t,max}(\lambda_2) \right)$$

$$g(x(t), u(t)) = 0$$
$$h_{nts}(x(t), u(t)) \leq h_{nts,max}$$
$$S_a(u(t), x(t)) \leq S_{a,max} + \lambda_1(S_a(x_I^*(t), u_I^*(t)) - S_{a,max}), a \in A_k$$
$$h_t(\overline{x}(1), \overline{u}(1), \cdots, x(t), u(t), \cdots, \overline{x}(T), \overline{u}(T)) \leq h_{t,max}(\lambda_2)$$
$$t \in \{1, 2, \cdots, T\}$$

where $$h_{t,max(\lambda_2)} = h_{t,max} + \cdots$$

$$\lambda_2(h_t(\overline{x}_I^*(1), \overline{u}_I^*(1), \ldots, x_I^*(t), u_I^*(t), \ldots, \overline{x}_I^*(T), \overline{u}_I^*(T))-h_{t,max})$$

$(x_I^*(t), u_I^*; (t))$ and $(\overline{x}_I^*(k); \overline{u}_I^*(k), k \neq t)$ are the solution of (13) obtained in stage I. When $\lambda_2=1.0$, problem (20) equals the decomposed subproblem in (13). When $\lambda_2=0.0$, problem (20) equals the reconstructed problem defined in (15). $\lambda_1$ works the same as $\lambda$ in (18). The two parameters $\lambda_1,\lambda_2$ will decrease alternatively from 1.0 to 0.0.

The second homotopy parameter $\lambda_2$ bridges the gap between the subproblems whose inter-temporal constraints are ignored and those whose inter-temporal constraints are reconsidered, which can help avoid the divergence caused by improperly chosen auxiliary variables.

A step-by-step description of the PDM performing the three-stage solution method for online multi-period power dispatch is presented below:

Step 1: Receive load forecasting data, renewable forecasting data, the participation factor of the AGC units, and the network data. Additionally, receive the current operating point (e.g., from a state estimator or from a solved power flow).

Step 2: Generate the scenarios of renewables and reduce them using AP clustering, then incorporate the clustered scenarios into an online multi-period power dispatch problem to be solved.

Step 3: Decompose the online multi-period power dispatch problem into single-period subproblems, by ignoring inter-temporal constraints. In one embodiment, each subproblem may be formulated by (13).

Step 4: Generate a solution for each subproblem free of thermal limit constraints. In one embodiment, the PDM may apply the PDIPM to solve each thermal limit constraint-free subproblem (17). Let the solution be $(u_I^*, (t), x_I^*(t))_0$, $t \in \{1, 2, \ldots, T\}$.

Step 5: Identify the violated and nearly (i.e., within a predetermined threshold) violated thermal limit constraints and form the initial active set of thermal limit constraints $A_0$ by (19) with the identified constraints, then form the parameterized subproblem $H(x,u,\lambda,t)$ (18). Set k=1, $\lambda=1-\Delta\lambda$.

Step 6: Apply the PDIPM to solve each parameterized subproblem $H(x,u,\lambda,t)$ (18), using $(u_I^*,(t),x_I^*(t))_{k-1}$ as the initial guess. If it converges to the solution, e.g., $(u_I^*(t),x_I^*(t))_k$, then go to step 7; otherwise, set $\lambda=\lambda+0.5\Delta\lambda$ and repeat this step.

Step 7: If $\lambda=0$, check the inter-temporal constraints at the solution $(u_I^*(t),x_I^*(t))_k$, $t \in \{1, 2, \ldots, T\}$ and go to step 8; otherwise, update the active set of thermal limit constraints $A_{k+1}=\{l | S_l(x_k^*)>0.9\overline{S}_l\}$ based on the solution $(u_I^*(t),x_I^*(t))_k$. Set k=k+1, $\lambda=\lambda-\Delta\lambda$, and go to step 6.

Step 8: If there are no violations of the inter-temporal constraints, terminate this procedure and save the solution $(u_t^*(t),x_t^*(t))_k$, $t\in\{1, 2, \ldots T\}$. Go to step 14; otherwise, go to step 9.

Step 9: Patch the solution of each single-period subproblem together to rebuild the inter-temporal constraints and formulate each parameterized problem H $(x,u,\lambda_1, \lambda_2,t)$ (20). Set p=1, q=1, $\lambda_2=1-\Delta\lambda_2$, and let $(u^*(t), x^*(t))_{0,0}=(u_t^*,t),x_t^*(t))$.

Step 10: Apply the PDIPM to solve each subproblem (20), using $(u^*(t),x^*(t))_{p-1,q-1}$ as the initial guess. If it converges to the solution, e.g., $(u^*(t),x^*(t))_{p-1,q}$, let $\lambda_1=\lambda_1-\Delta\lambda_1$. If $\lambda_1<0$, set $\lambda_1=0$ and update the auxiliary variables and inter-temporal Lagrange multipliers for all subproblems, then go to step 11; otherwise, $\lambda_2=\lambda_2+0.5\Delta\lambda_2$ and repeat this step.

Step 11: Apply the PDIPM to solve each subproblem (20), using $(u^*(t),x^*(t))_{p-1,q}$ as the initial guess. Update the active set of thermal limit constraints $A_q=\{l|S_l(u_{p-1,q}^*x_{p-1,q}^*)>0.9\overline{S}_l\}$. If it converges to the solution, e.g., $(u^*(t)x^*(t))_{p,q}$, then go to step 12; otherwise $\lambda_1=\lambda_1+0.5\Delta\lambda_1$ and repeat this step.

Step 12: If $\lambda_1=0$, $\lambda_2=0$, and the stopping criteria are satisfied, go to step 14; otherwise, go to step 13.

Step 13: Set p=p+1, q=q+1, and $\lambda_2=\lambda_2-\Delta\lambda_2$. If $\lambda_2<0$, set $\lambda_2=0$ and go to step 10.

Step 14: Output the solution u*, where the output includes the power output of non-AGC units, the set point of the AGC units, the charge or discharge power of each storage device, and the total operational cost.

Note that steps 4, 6, 10, and 11 may be implemented by parallel computations on multiple processors or cores to solve each single-period subproblem in parallel. Parallel computations can remarkably improve the computational efficiency. In one embodiment, different subproblems may be assigned to and solved by different processors in a multi-processor computer system.

In this disclosure, an online multi-period power dispatch formulation with renewable uncertainty and storage is proposed. The AP clustering is used to reduce the number of scenarios. A three-stage methodology with an adaptive homotopy-enhanced PDIPM is also proposed to solve the large-scale nonlinear optimization problem.

Considering the trend of operating environments toward small operating margins, the disclosed method is different from conventional real-time power dispatch methods in that it takes AC power flow equations plus the voltage and thermal limits into consideration, which can ensure that the obtained solution causes no violations in the thermal limits or voltage limits and the transfer capability.

A three-stage solution methodology is proposed for robust and efficient computation of the online dispatch problem. The first stage is to decompose the problem by ignoring the ramping constraints and the energy level of storage constraints and solving each subproblem. Then the boundary condition is constructed for each subproblem. In the third stage, a two-parameter homotopy-enhanced PDIPM is proposed to solve the reconstructed subproblems. This solution methodology can enhance the robustness of the PDIPM and, concurrently, it converges at a high speed. Through numerical implementation, the robustness and computational efficiency (especially for large-scale systems) of the proposed methodology is verified.

Advantageous features of the disclose method and system include, but are not limited to the following:

(1) A comprehensive formulation for online multi-period power dispatch with AC power flow equations, thermal limits, voltage limits, ramping constraints, renewable uncertainty, and an energy storage system is presented. The inclusion of AC power flow equations, thermal limits and voltage limits ensures that the obtained solution causes no thermal limit or voltage limit violations and meets the requirements of transfer capability.

(2) A scenario reduction based on AP clustering is proposed to reduce the number of scenarios.

(3) A three-stage solution methodology is developed to reliably and quickly solve the online multi-period power dispatch problem.

(4) A two-parameter homotopy-enhanced methodology with a decomposition scheme is developed to enhance the robustness of the PDIPM and improve the computational efficiency for online application.

Figure 5:
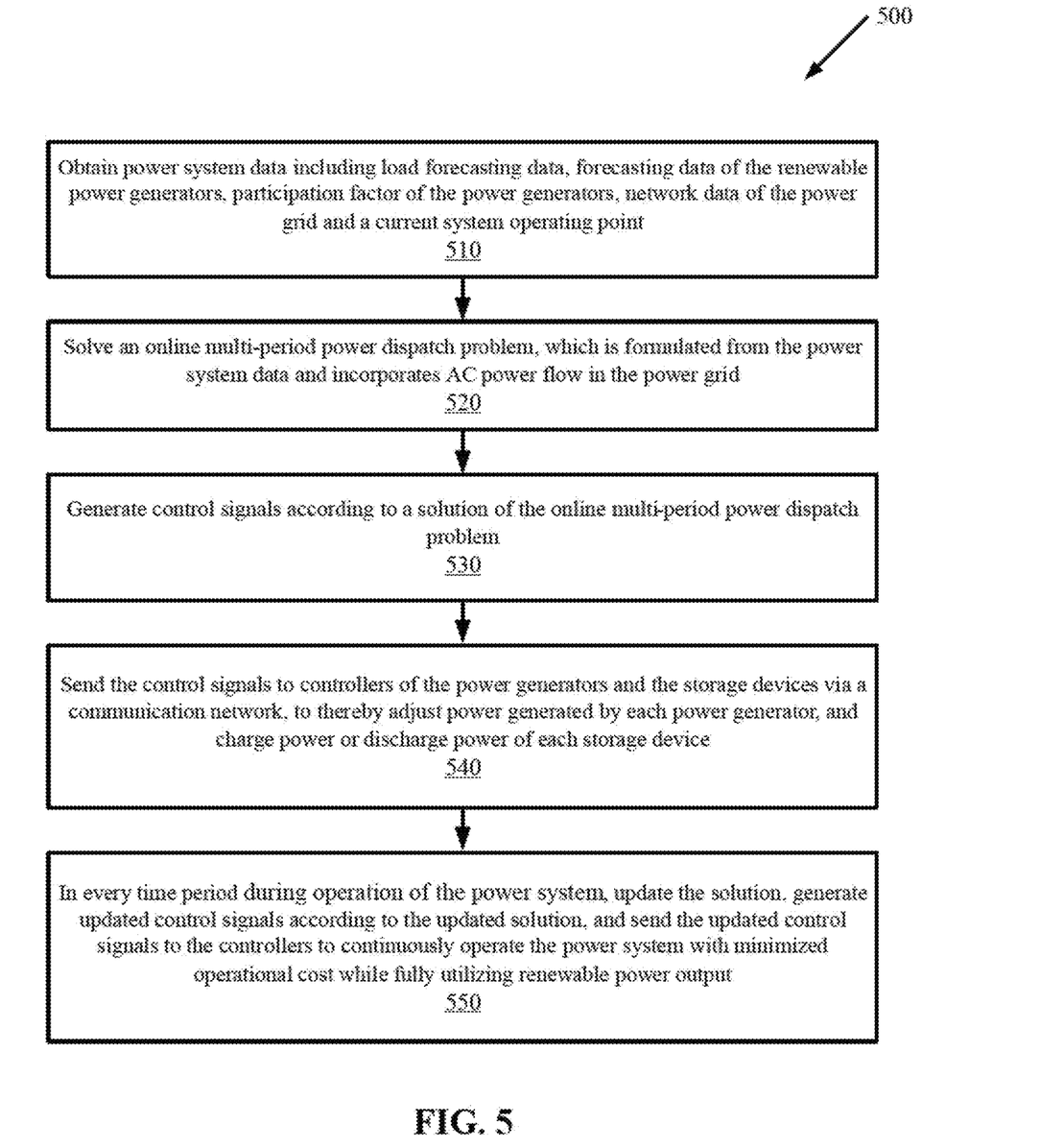
FIG. 5 illustrates a flow diagram of a method for performing online multi-period power dispatch according to one embodiment.

FIG. 5 illustrates a flowchart of a method 500 for real-time controlling power dispatch in a power system (e.g., the power system 100 of claim 1) that includes power generators, renewable power generators, load, and storage devices interconnected by a power grid. The method 500 may be performed by a computer system; e.g., the computer system 175 in the control center 170 of FIG. 1, and/or the computer system 600 of FIG. 6.

The method 500 begins at step 510 with the computer system obtaining power system data including load forecasting data, forecasting data of the renewable power generators, participation factor of the power generators, network data of the power grid and a current system operating point. At step 520, the computer system solves an online multi-period power dispatch problem, which is formulated from the power system data and incorporates AC power flow in the power grid. At step 530, the computer system generates control signals according to a solution of the online multi-period power dispatch problem. At step 540, the computer system sends the control signals to controllers of the power generators and the storage devices via a communication network, to thereby adjust power generated by each power generator, and charge power or discharge power of each storage device. Steps 510-540 are repeated in in every time period during operation of the power system. The repetitions of steps 510-550 are incorporated into step 550. At step 550, in every time period during operation of the power system, the computer system updates the solution, generates updated control signals according to the updated solution, and sends the updated control signals to the controllers to continuously operate the power system with minimized operational cost while fully utilizing renewable power output. In one embodiment, the online multi-period power dispatch problem may be decomposed into multiple single-period subproblems. Each of the single-period subproblems has an objective of minimizing a total operational cost of the power system under system constraints that include at least power generation limits, thermal limits and voltage limits and exclude inter-temporal constraints. Each single-period subproblem is solved using a homotopy-enhanced primal-dual interior point method (PDIPM) to produce the solution compliant with the system constraints.

Figure 6:
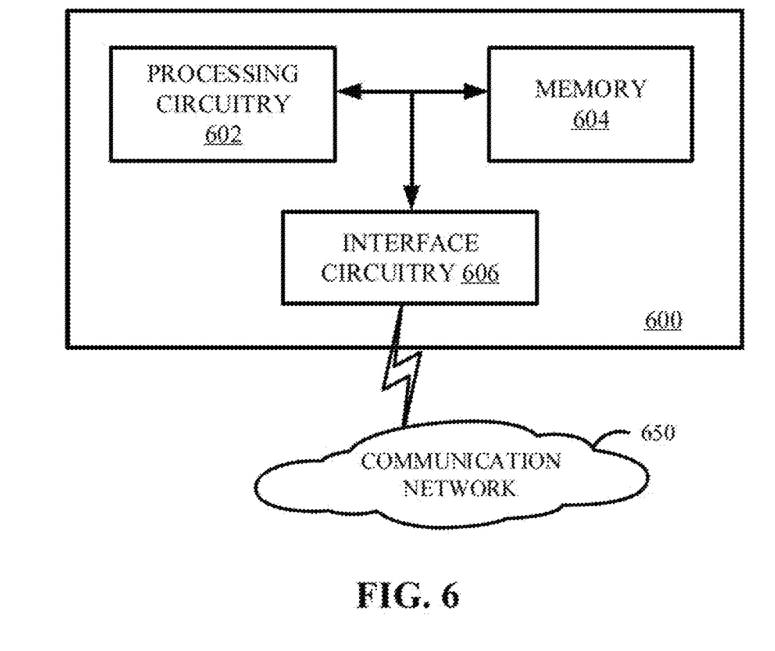
FIG. 6 is a block diagram of a computer system according to one embodiment.

Referring to FIG. 6, the computer system 600 may be a server computer, a multi-processor computer, or any machine capable of executing a set of instructions (sequential or otherwise) that specify actions to be taken by that machine. While only a single machine is illustrated, the term "machine" shall also be taken to include any collection of machines (e.g., computers) that individually or jointly execute a set (or multiple sets) of instructions to perform any one or more of the methodologies discussed herein. In one embodiment, the computer system 600 includes circuitry which further includes processing circuitry 602, a memory 604 or instruction repository, and interface circuitry 606.

The interface circuitry 600 can include at least one input port and at least one output port. The memory 604 contains instructions executable by the processing circuitry 602 whereby the computer system 600 is operable to perform the various embodiments as described herein, including method 500 of FIG. 5. In one embodiment, a part or all of the data and code for performing the various embodiments described herein may be received over a communication network 650 via the network interface device 606.

Embodiments may be represented as a software product stored in a machine-readable medium (such as the non-transitory machine readable storage media, also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

While the invention has been described in terms of several embodiments, those skilled in the art will recognize that the invention is not limited to the embodiments described and can be practiced with modification and alteration within the spirit and scope of the appended claims. The description is thus to be regarded as illustrative instead of limiting.

What is claimed is:

1. A method for real-time controlling power dispatch in a power system that includes power generators, renewable power generators, load, and storage devices interconnected by a power grid, comprising:
   obtaining input data including load forecasting data, forecasting data of the renewable power generators, participation factor of the power generators, network data of the power grid and a current system operating point;
   solving an online multi-period power dispatch problem, which is formulated from the input data and incorporates alternating current (AC) power flow in the power grid;
   generating control signals according to a solution of the online multi-period power dispatch problem;
   sending the control signals to controllers of the power generators and the storage devices via a communication network, to thereby adjust power generated by each power generator, and charge power or discharge power of each storage device; and
   in every time period during operation of the power system, updating the solution, generating updated control signals according to the updated solution, and sending the updated control signals to the controllers to continuously operate the power system with minimized operational cost while utilizing renewable power output,
   wherein solving the online multi-period power dispatch problem further comprises:
   decomposing the online multi-period power dispatch problem into multiple single-period subproblems, where each of the single-period subproblems has an objective of minimizing a total operational cost of the power system under system constraints that include at least power generation limits, thermal limits and voltage limits and exclude inter-temporal constraints; and
   solving each single-period subproblem using a homotopy-enhanced primal-dual interior point method (PDIPM) to produce the solution compliant with the system constraints.

2. The method of claim 1, wherein obtaining the input data further comprises:
   generating scenarios of renewable power generation for each time period based on the historical data of the renewable power generators, wherein each scenario specifies power outputs of all of the renewable power generators in the time period;
   clustering the scenarios into groups of scenarios;
   selecting a number of scenarios from each group to reduce a total number of the scenarios; and
   incorporating the selected scenarios into the input data to capture uncertainties of the renewable power output.

3. The method of claim 1, wherein the inter-temporal constraints include ramping constraints of the power generators and energy level constraints of the storage devices.

4. The method of claim 1, wherein solving each single-period subproblem further comprises:
   applying a one-parameter homotopy-enhanced PDIPM to solve each single-period subproblem.

5. The method of claim 1, wherein solving each single-period subproblem further comprises:
   in response to a determination that the inter-temporal constraints are not violated, combining solutions of the single-period subproblems to produce the solution of the online multi-period power dispatch problem.

6. The method of claim 1, wherein solving each single-period subproblem further comprises:
   in response to a determination that at least one of the inter-temporal constraints is violated, reformulating the single-period subproblems by adding back the inter-temporal constraints as boundary constraints to produce a set of reconstructed subproblems.

7. The method of claim 6, further comprising:
   iteratively solving each reconstructed subproblem by a two-parameter homotopy-enhanced PDIPM until a convergence criterion is satisfied.

8. The method of claim 1, wherein solving each single-period subproblem further comprises:
   solving each subproblem without the thermal limits by the PDIPM to obtain a first solution for the subproblem; and
   formulating, taking the thermal limits into account, a one-parameter homotopized problem based on the first solution.

9. The method of claim 1, wherein the solution includes respective power outputs of non-automatic-gain-control (non-AGC) units, respective set points of automatic-gain-control (AGC) units, the charge power or the discharge power of each storage device, and the total operational cost.

10. The method of claim 1, wherein solving each single-period subproblem further comprises:
    solving different ones of the subproblems by different ones of processors in a multi-processor computer system.

11. A computer system for real-time controlling power dispatch in a power system that includes power generators, renewable power generators, load, and storage devices interconnected by a power grid, the computer system comprising:

memory; and one or more processors operative to:

obtain input data including load forecasting data, forecasting data of the renewable power generators, participation factor of the power generators, network data of the power grid and a current system operating point;

solve an online multi-period power dispatch problem, which is formulated from the input data and incorporates alternating current (AC) power flow in the power grid;

generate control signals according to a solution of the online multi-period power dispatch problem;

send the control signals to controllers of the power generators and the storage devices via a communication network, to thereby adjust power generated by each power generator, and charge power or discharge power of each storage device; and in every time period during operation of the power system, update the solution, generate updated control signals according to the updated solution, and send the updated control signals to the controllers to continuously operate the power system with minimized operational cost while utilizing renewable power output, wherein, when solving the online multi-period power dispatch problem, the one or more processors are further to:

decompose the online multi-period power dispatch problem into multiple single-period subproblems, where each of the single-period subproblems has an objective of minimizing a total operational cost of the power system under system constraints that include at least power generation limits, thermal limits and voltage limits and exclude inter-temporal constraints; and solve each single-period subproblem using a homotopy-enhanced primal-dual interior point method (PDIPM) to produce the solution compliant with the system constraints.

12. The computer system of claim 11, wherein obtaining the input data further comprises:

generating scenarios of renewable power generation for each time period based on the historical data of the renewable power generators, wherein each scenario specifies power outputs of all of the renewable power generators in the time period;

clustering the scenarios into groups of scenarios;

selecting a number of scenarios from each group to reduce a total number of the scenarios; and incorporating the selected scenarios into the input data to capture uncertainties of the renewable power output.

13. The computer system of claim 11, wherein the inter-temporal constraints include ramping constraints of the power generators and energy level constraints of the storage devices.

14. The computer system of claim 11, wherein when solving each single-period subproblem the one or more processors is further operative to: apply a one-parameter homotopy-enhanced PDIPM to solve each single-period subproblem.

15. The computer system of claim 11, wherein when solving each single-period subproblem the one or more processors is further operative to: in response to a determination that the inter-temporal constraints are not violated, combine solutions of the single-period subproblems to produce the solution of the online multi-period power dispatch problem.

16. The computer system of claim 11, wherein when solving each single-period subproblem the one or more processors is further operative to: in response to a determination that at least one of the inter-temporal constraints is violated, reformulate the single-period subproblems by adding back the inter-temporal constraints as boundary constraints to produce a set of reconstructed subproblems.

17. The computer system of claim 16, wherein the one or more processors is further operative to: iteratively solve each reconstructed subproblem by a two-parameter homotopy-enhanced PDIPM until a convergence criterion is satisfied.

18. The computer system of claim 11, wherein when solving each single-period subproblem the one or more processors is further operative to:

solve each subproblem without the thermal limits by the PDIPM to obtain a first solution for the subproblem; and formulate, taking the thermal limits into account, a one-parameter homotopized problem based on the first solution.

19. The computer system of claim 11, wherein the solution includes respective power outputs of non-automatic-gain-control (non-AGC) units, respective set points of automatic-gain-control (AGC) units, the charge power or the discharge power of each storage device, and the total operational cost.

20. The computer system of claim 11, wherein when solving each single-period subproblem the one or more processors is further operative to: solve different ones of the subproblems by different ones of the processors.

* * * * *